United States Patent Office 3,211,816
Patented Oct. 12, 1965

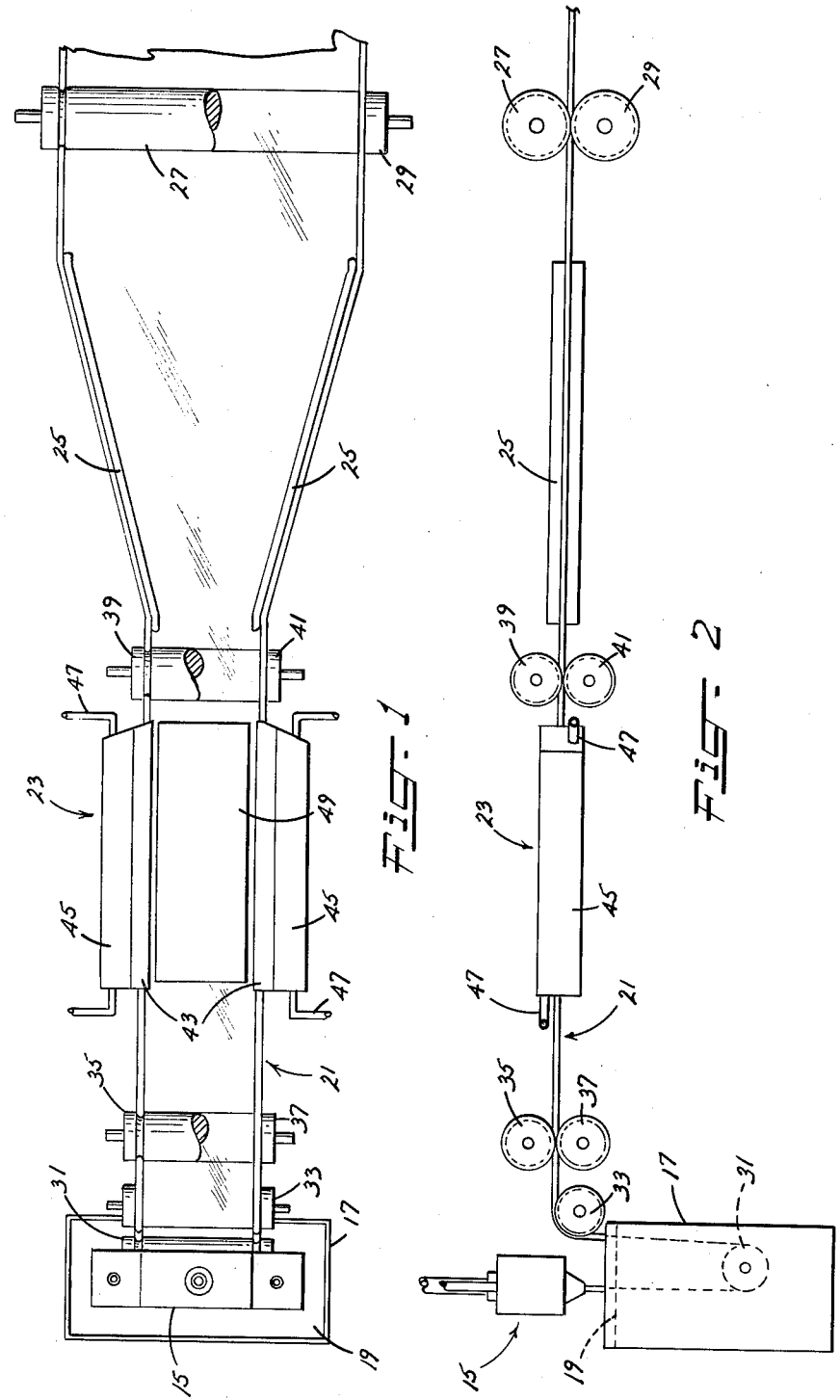

3,211,816
METHOD AND APPARATUS FOR SHAPING AND STRETCHING BEADED EDGE FILMS
William H. Brown, Jr., Drexel Hill, Pa., assignor, by mesne assignments, to FMC Corporation, San Jose, Calif., a corporation of Delaware
Filed Jan. 3, 1962, Ser. No. 163,991
7 Claims. (Cl. 264—95)

The invention relates to the production and orientation of films or sheets, and more particularly to an improved method and apparatus for shaping and stretching of films having hollow thickened or beaded portions along opposite edges thereof.

To better adapt films for various manipulative operations, it is customary to initially shape the same with thickened or beaded longitudinal edges. Aside from imparting increased strength to the film, the beaded edges often serve as a means by which the film may be engaged and passed through subsequent treatments, and particularly stretching operations, in a continuous manner. Biaxial stretching of a beaded edge film can be achieved, for example, by guiding the beaded edges of the film along diverging paths as the film is simultaneously advanced and tensioned in a longitudinal direction. Conventional stretching procedures, however, do not offer satisfactory control over the applied stretching tensions, thus making the stretching operation difficult and generally providing non-uniformly oriented films.

Biaxially oriented film having improved properties can be obtained by heating the web of a beaded edge film to a higher temperature than the beaded edges thereof before any stretching tensions are applied. By preheating the film in this manner, the applied transverse tensions are confined to the web itself, thus providing for more uniform orientation and minimizing the reduction in the size of the film beaded edges.

Regardless of the procedure employed in simultaneously orienting beaded edge films, the beaded edges thereof must yield in response to the applied longitudinal tensions. In view of the relatively large mass and perhaps cooler temperature of the film beaded edges, it is usually necessary to employ equipment which is more powerful than that reequired for stretching of the web itself. The need for such heavier and more expensive stretching equipment becomes more pronounced during cold stretching operations or when the film web is heated to a temperature above that of the film beaded edges yet well below the softening range of the particular film-forming material employed. Under such conditions, longitudinal stretching of the relatively massive and cold beaded edges of the film is achieved with difficulty and is generally accompanied by uneven stretching along those portions of the film web directly adjacent to the beaded edges. Aside from the operating difficulties encountered, the removal of the distorted portions of the film web as well as the large beaded edges involves considerable waste. Accordingly, a primary object of the invention is to provide a new or improved and more satisfactory method and apparatus for producing and stretching beaded edge films.

Another object is to provide a method and apparatus for making and stretching films having enlarged or beaded longitudinal edges of hollow construction.

Still another object is to provide an extrusion method and apparatus for making beaded edge films wherein streams of film-forming material are shaped into tubular form, inflated with a gaseous medium, and combined with the edges of a flat stream of film-forming material shaped independently.

Another object is the provision of a method and apparatus wherein a gaseous medium is delivered into hollow beaded edges of a film as such film is formed for maintaining the same inflated during solidification and subsequent stretching operations.

These and other objects and advantages of the invention will be apparent from the following description and accompanying drawing in which:

FIGURE 1 is a plan view of the apparatus for forming and stretching beaded edge films in accordance with the method of the present apparatus;

FIGURE 2 is a side view of the apparatus shown in FIGURE 1;

Figure 3:
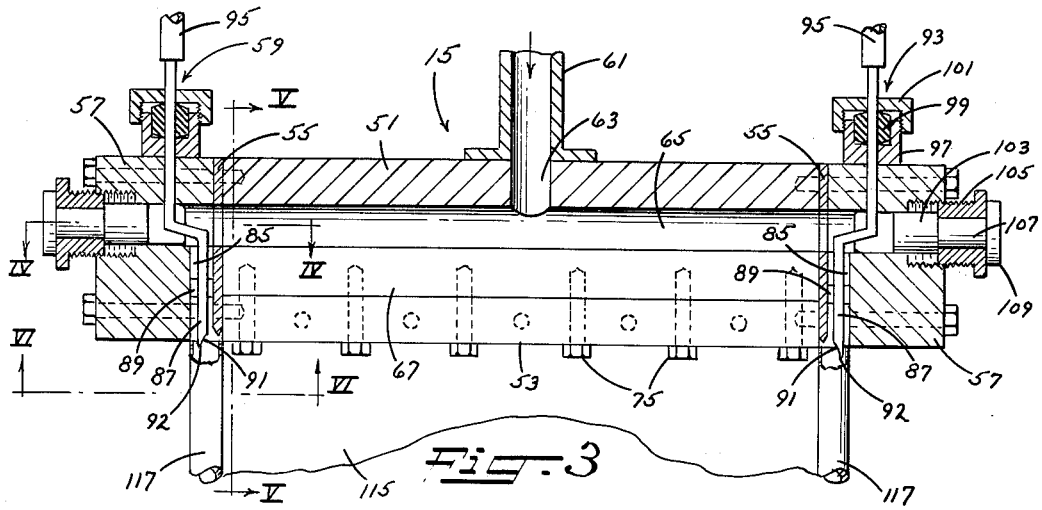
FIGURE 3 is a vertical section taken longitudinally of the nozzle of the present invention.

In general, the present invention is directed to a method and apparatus for making and stretching a film or sheet having hollow thickened or beaded longitudinal edges. The beaded edge film of the present invention is preferably formed by shaping plastic or flowable film-forming material into two independent hollow or tubular streams of desired cross section, inflating the streams with a gaseous medium and uniting the same with the longitudinal edges of a flat stream of film-forming material shaped independently. The inflating gaseous medium serves to maintain the shape imparted to the hollow streams as they together solidify with the shaped flat stream of film-forming material to provide a beaded edge film, and additionally to prevent collapse of the beaded edges as the film is subsequently stretched.

The die or nozzle of the present invention in some respects resembles a nozzle of conventional construction and includes a housing having a feed chamber which opens into a space formed by a pair of cooperating blades fixed to the housing, a channeled block secured to each end of the housing, a spaced or divider plate interposed between each end block and housing and means cooperating with the divider plates and end block channels for shaping film-forming material into continuous hollow streams and for inflating the same with a gaseous medium.

As film-forming material is delivered into the housing feed chamber, a portion thereof is passed between the blades where it is shaped into a flat stream having a desired thickness while other portions thereof are directed into the end block channels. A tube extends through each of the end block channels, in spaced relationship with the walls thereof, and cooperates with the walls of such channel and an adjacent divider plate in shaping film-forming material into an independent hollow stream of desired size and shape. These shaped streams of film-forming material are maintained in tubular shape by a gaseous medium, such as air, delivered through the end block tubes, and are engaged with the longitudinal edges of the flat stream of film-forming material either prior to, during or immediately after such web passes between the extrusion blades. If desired, and as a particular advantage during high speed extrusion operation, the exit portions of the end block tubes may be cut at an angle to their respective axes and bent slightly toward each other so that gaseous medium issuing therefrom tends to urge the hollow streams into closer engagement with the longitudinal edges of the independently shaped flat stream of film-forming material. Alternatively, a similar result may be achieved by having the end block channels disposed in converging relationship so as to direct the shaped hollow streams issuing therefrom toward and into engagement with the shaped flat stream of film-forming material.

Once the shaped flat and hollow streams of film-forming material are combined into a unit, as mentioned above, they are solidified to provide a beaded edge film. At both the start and completion of extrusion operation, the shaped hollow streams of film-forming material are pinched, while still in a plastic state, to seal the inflating gaseous medium against escape. The resulting beaded edge film may be stretched immediately after formation, as a continuous process, or may be collected for further processing at a later time.

The method and apparatus of the present invention are hereafter described as employed in the manufacture of beaded edge films formed of plastic or fusible film-forming materials, and more specifically beaded edge films formed of polymeric materials. For the sake of simplicity and ease of description the method and apparatus of the present invention are hereafter described as employed in making and stretching of beaded edge films formed of polypropylene. The teachings of the present invention, however, are applicable to the forming and stretching of beaded edge films from a variety of different materials which are capable of being rendered plastic or molten for extrusion. As heretofore mentioned, and more fully described hereafter, the film produced by the method and apparatus of the present invention consists of a web of substantially uniform thickness across its entire width having thickened or beaded opposite longitudinal edges. It will be understood that the size and shape of the film web and beads may be varied from that illustrated without departing from the spirit and scope of the invention.

With reference to the accompanying drawing, FIGURES 1 and 2 diagrammatically illustrate the apparatus employed in the practice of the present invention which includes a nozzle 15 for shaping molten polypropylene into a flat stream having hollow and inflated enlarged longitudinal edges, a tank 17 containing a cooling liquid 19, such as water, for quenching the shaped polypropylene into a film 21, means 23 for preheating the resulting film for hot drawing operations, and means, as for example, tracks 25 and take-up rolls 27 and 29 for biaxially stretching the preheated film. A roller 31, submerged within the cooling liquid 19, serves to reverse the path of the quenched film and direct the same to a guide roller 33. Nip rolls 35 and 37 advance the film to the preheater 23, while metering rolls 39 and 41 serve to urge the preheated film into the stretching tracks 25 at a uniform rate of speed.

While any desired means may be employed for heating the film for hot drawing operations, the preheater as shown at 23 includes tracks 43 which slidably engage with the beaded edges of the advancing film, ducts 45 through which heated fluid is circulated by conduits 47 to heat the film beaded edges and radiant panels 49 for heating the film web to a temperature higher than that of the film beaded edges but below a temperature at which the film is rendered molten.

Referring now to FIGURES 3–7 of the drawing, the nozzle 15 includes an elongated main body or housing 51, spaced lip members or extrusion blades 53, spacer or divider plates 55, end blocks 57 and gas delivery tubes 59. The housing 51 is connected to a supply conduit 61 and is provided with an inlet opening 63 through which molten polypropylene is delivered into a feed chamber 65 extending along the entire housing length. A slot or restricted passage 67 opens into the feed chamber 65 for directing the molten polypropylene into an extrusion orifice 69 formed by the blades 53. A recess 73 is formed in the forward wall of the housing 51 for receiving the blades 53 which are held in place by bolts 75 which extend through enlarged or elongated openings in the blades themselves so as to permit the same to be selectively adjusted toward and away from each other. Adjustment of the blades 53 is effected by tension screws 77 which pass through portions of the housing 51 and are threaded into the blades themselves, with tension being applied to the screws 77 by nuts 79 which bear up against adjacent housing walls.

Figure 4:
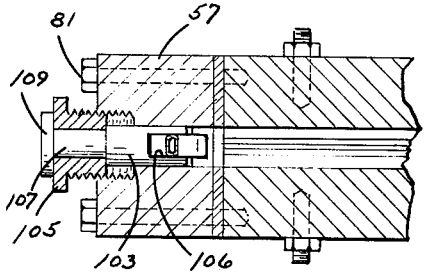
FIGURE 4 is a longitudinal section of a portion of the nozzle shown in FIGURE 3 taken along the line IV—IV.
Figure 5:
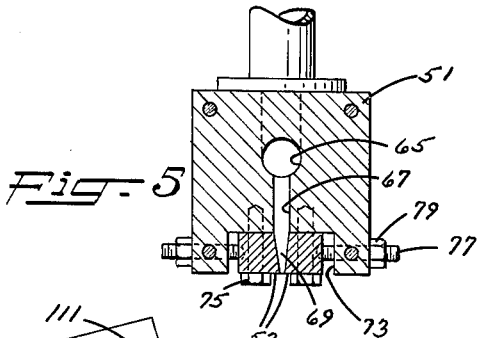
FIGURE 5 is a vertical section of the nozzle shown in FIGURE 3 taken along the line V—V.
Figure 6:
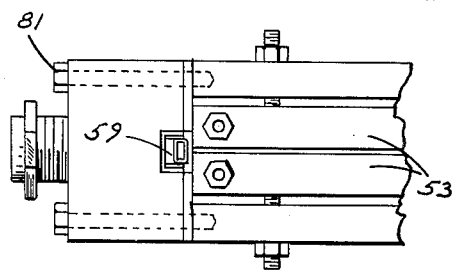
FIGURE 6 is a view of one end of the nozzle shown in FIGURE 3 as seen along the line VI—VI.

The divider plates 55 and end blocks 57 are secured to the ends of the housing 51 by bolts 81. Each of the plates 55 is provided with an opening 83 which registers with and connects the housing feed chamber 65 with a channel or slot 85 formed within and extending through an adjacent end block 57. The channels are of a configuration which generally conforms to the desired external shape of the beads in the finished film and, as best seen in FIGURES 4 and 6, are longitudinally aligned with the ends of the extrusion orifice 69.

The tubes 59 extend into and through each of the end blocks 57 and include terminal portions 87 which are spaced from the adjacent walls of the end block channels 85 and spacer plates 55, as for example by thin fins 89. For reasons as more fully described hereafter the exit ends of the tube terminal portions 87 are disposed along planes which are inclined relative to the axes of the respective tubes, as indicated at 91. The opposite ends of the tubes 59 extend through seals 93 and are secured to conduits 95 which are in turn connected to a source of compressed gas, such as air. The seals 93 each include a sleeve 97 for receiving a compressible packing 99, and a cap 101 which serves to compress the packing 99 snugly within the sleeve 97 and about the tube 59 as it is tightened. In addition to avoiding leakage of film-forming material from the end blocks 57, the packing 99 serves to frictionally retain the tubes 59 in their adjusted positions, as more fully described hereafter.

The flow of film-forming material into the end block channels 85 may be controlled by valves 103 which are adapted to be projected across the entrance thereof by threaded actuating sleeves 105. The valves 103 are each slotted at 106 to facilitate movement thereof relative to the adjaecnt tubes 59, and are provided with portions 107 of reduced diameter on which the sleeves 105 are captively, but rotatably, retained by enlarged or flanged portions 109.

Figure 7:
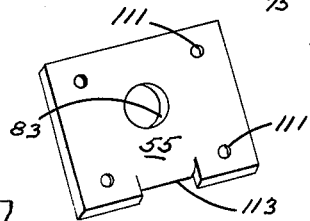
FIGURE 7 is a perspective view of one element of the nozzle shown in FIGURE 1.

For the sake of simplicity in the manufacture and assembly of the parts, the divider plates 55 are of a construction as shown in FIGURE 7, each having openings 111 for the reception of bolts 81 and a notch 113 in one edge corresponding to the width of the end block channel 85. Preferably, the notched edge of the divider plates 55 are tapered or feathered to faciiltate a streamlined flow of the molten polymer relative thereto.

In using the nozzle of the invention, the blades 53 are initially adjusted by the tension screws 77 and nuts 79 to provide an extrusion orifice 69 of desired size, after which the bolts 75 are tightened to fix the blades 53 in place. The molten polyproylene is then delivered through the conduit 61 and into the nozzle housing 51 where it initially fills the feed chamber 65 and the restricted passage 67. As the molten polypropylene is continuously delivered through the conduit 61, the polymer within the restricted passage 67 is urged into and through the extrusion orifice 69 in the form of a flat stream 115 of substantially uniform thickness across its entire width. Concomitantly, portions of the molten polypropylene within the feed chamber 65 are gradually forced through the divider plate openings 83 and into the end block channels 85 where they are provided with a desired, hollow configuration. The polymer flow into the channels 85 can of course be regulated by the adjustment of the valves 103.

As heretofore described, and shown in FIGURE 4, the end block channels 85, and particularly the exit portions thereof, are aligned longitudinally with the extrusion orifice 69 so that the hollow shaped streams 117 engage with the adjacent edges of the shaped flat stream 115 of molten polypropylene immediately as they move beyond the notched edges 113 of the plates 55. A gaseous medium, such as air, is then delivered through the tubes 59 into the shaped hollow streams as they travel beyond the exit ends of the terminal portions thereof. At the start, and also at the end of extrusion operations the shaped hollow streams of polypropylene 117 are tightly closed, as by pinching, and then the confined gaseous medium serves to maintain the hollow streams 117 inflated as they engage with the flat stream 115. The combined streams of polypropylene are then quenched within the liquid 19 to provide the film 21 which may be advanced by the nip rolls 35 and 37 to and through the preheater 23 and then uniaxially or biaxially stretched by tracks 25 and take-up rolls 27 and 29. Alternatively, the film 21 may be cold drawn or collected and stored for stretching at a later time. Regardless of the manner by which the film 21 is stretched, it will be noted that its enlarged hollow beaded edges 119 (see FIGURE 8) are capable of yielding to longitudinal stretching tensions more readily than solid beaded edges, yet are prevented from collapsing, in response to both transverse and longitudinal stretching tensions, by the contained gaseous medium. Care should be taken, of course, to prevent the escape of the gaseous medium from the hollow beaded edges of the film during formation and film stretching operations. Further, to avoid premature setting of the hollow streams, the gaseous medium is preferably heated to substantially the same temperature as the polymeric material forming such streams.

As shown in FIGURE 3, the divided plates 55 each serve to maintain a separate flow of molten polymer through the extrusion orifice 69 and the end block channels 85. Therefore, the hollow streams of polymeric material 117 shaped within the end block channels 85 engage with the longitudinal edges of the flat stream of polymeric material 115 at substantially the same time as such flat stream issues from the extrusion orifice. Since the shaped flat and hollow streams of polymeric material are merged together prior to any substantial cooling of the same, any tendency for the flat stream 115 to neck or contact transversely, as during cooling or in response to longitudinal tensions applied by nip rolls 35 and 37, will have no significant affect on the strength or uniformity of the bond between the hollow beads and web in the finished film.

The location at which the shaped flat and hollow streams are combined will depend upon such factors as the size of the film beads, the rate of extrusion, the temperature of the molten polymer, etc. It is preferred that the divided plates be as thin as possible, on the order of 0.010 to 0.015 inch, to insure that the shaped flat and hollow streams are properly united; that is, while still in a highly desired plastic condition when combined. A preferred procedure, however, is to use divider plates which are thin in cross section, as noted above, but which are of different lengths to effect merger of the shaped flat and hollow streams at a desired location. Under certain conditions the plates 55 may be of such length that their free edges are located within the nozzle itself while under other conditions the plates 55 may project beyond the outer surfaces of the blades 53. The degree to which the plates 55 project from the nozzle should, of course, be minimized to insure that the extruded streams are still in a plastic or tacky condition and are properly aligned when they are engaged with each other.

To further assist in assuring snug contact between the shaped flat and hollow streams of polymeric material, the exit end of the tubes 59 may be formed with inclined surfaces 91 and may be bent toward each other as shown at 92 so that at least a relatively small but significant component of the gaseous medium issuing therefrom tends to urge the shaped hollow streams 117 toward and into close contact with the longitudinal edges of the flat stream 115. Since the seals 93 permit adjustment of the tubes 59 along axial directions, the exit ends thereof may be positioned at various locations relative to edges of the adjacent divider plates to secure optimum results under different operating conditions.

Figure 8:
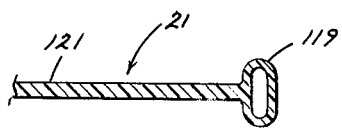
FIGURE 8 is a vertical section taken transversely through a portion of a beaded edge film formed in accordance with the present invention.

As shown in FIGURE 8, the film 21 produced by the above described method and apparatus possesses longitudinal beaded edges 119 which are sufficiently large to facilitate further processing of the film yet which can be more easily maintained at a desired temperature and elongated during stretching operations in view of their hollow construction. Of particular significance is that the web 121 of the film 21 is of substantially uniform thickness along its entire width. Completely lacking in the film 21 are necked or drawn portions along the film web directly adjacent to the longitudinal beaded edges. Such necked portions are common in beaded edge films produced by conventional procedures and are believed to be due to the surface tension forces which act upon the molten polymer during extrusion. These surface tension forces act uniformly along the entire circumference of the shaped streams forming the film beads and naturally tend to minimize the surface area thereof. When extruding polymeric material as a single stream having enlarged edge portions, the effect of the surface tension forces acting upon the enlarged portions of the stream are also exerted on that portion of the polymer which is to form the film web. As a result, some of the molten polymer of the latter portion is drawn into the enlarged portions of the stream, thus providing the finished film with necked or drawn portions directly adjacent to the film beads.

While surface tension forces are not eliminated by the above described method and apparatus, it appears that the initial shaping of the molten polymer into separate streams confines the effects of such surface tension forces to the independent hollow streams and thus assists in the shaping of the same. As such hollow streams are combined with the independently shaped flat streams, the molten polymer constituting these parts is apparently in an equilibrium condition and thus retains the shape which has been imparted thereto by the respective shaping members.

A further advantage of the nozzle described is the ability to accurately control the size of the beaded edges of the film as the thickness of the film web is varied. As heretofore mentioned, the shaped molten polymer is quenched as it issues from the nozzle, preferably by a water bath located at a predetermined distance from the nozzle itself. Often the nip rolls 35 and 37 are driven at such speed as to draw the molten polymer as it is extruded from the nozzle to thereby longitudinally orient the polymer molecules to at least a small degree and render the film more suitable for biaxial stretching.

When the molten polypropylene is flowing from the extrusion orifice 69 and end block channels 85 at substantially the same velocity, at any given surface speed of the nip rolls 35 and 37 the web draw-down ratio (WDR) will be equal to the bead draw-down ratio (BDR). The rate of quenching or the distance traveled by the freshly extruded streams before being quenched would provide a film web and bead edges of certain specific sizes under these operating conditions. If the valves 103 are now adjusted to reduce the flow of the molten polymer into the end block channels 85 the hollow streams of molten polymer therefrom are of the same overall cross section as heretofore provided but are moving at a reduced velocity. With the surface speed of the nip rolls 35 and 37 kept constant, the bead draw-down ratio (BDR) will, of course, be increased so that hollow beads of smaller overall cross section will result. Additionally, if no change is made in the rate at which the polypropylene is delivered to the nozzle, adjustment of the valves 103 as described will urge a larger quantity of polymer into the extrusion orifice 69 from which it will issue at an increased velocity. As a result, the web draw-down ratio (WDR) will be reduced and, if the rate of quenching is maintained constant, the web of the resulting film will be of greater thickness. Alternatively, the freshly extruded film may be quenched more rapidly so as to maintain the film web of constant size.

Thus, reducing the flow of molten polypropylene to the end block channels will reduce the velocity of the molten polymer issuing therefrom and thereby increase the bead draw-down ratio (BDR). If no change is made in the rate of quenching of the molten polymer as it is extruded or the surface speed of the nip rolls 35 and 37, the polymer streams forming the beaded edges of the film will be drawn to a greater degree so as to provide film beaded edges of smaller cross section or thickness. On the other hand, if this reduced flow of molten polymer through the end block channels is compensated by reducing the surface speed of the nip rolls 35 and 37 both the web and beaded draw-down ratios are reduced so that both the web and beaded edges of the resulting film will be of increased thickness. If the surface speed of the nip rolls 35 and 37 is reduced to an extent at which the bead draw-down ratio (BDR) is the same as that which existed under the initial operating conditions, it will be apparent that the size of the beaded edges of the resulting film will be the same as that formed on the original film, while the film web will be of increased thickness.

Results which are generally opposite to those described above can, of course, be attained by increasing the amount of polypropylene delivered into the end block channels.

Figure 9:
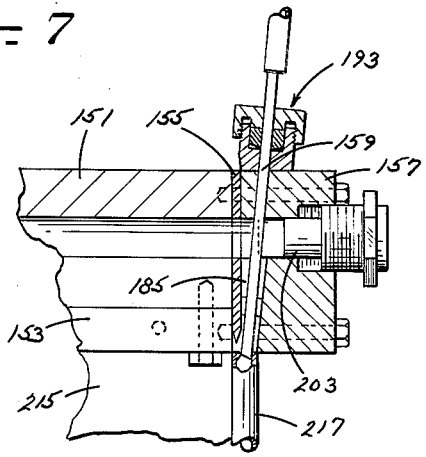
FIGURE 9 is a vertical section taken longitudinally through a portion of a modified nozzle construction.

The embodiment of the nozzle shown in FIGURE 9 of the drawing includes a main housing 151, shaping blades 153, divider plates 155, and end blocks 157 having inclined channels 185 through which extend gas delivery tubes 159. Seals 193 and valves 203 are provided for performing the same functions as the corresponding elements of the nozzle shown in FIGURE 3.

The operation of this modified nozzle structure is similar to that heretofore described, with the exception that molten polymer issuing from the end block channels 185 as hollow shaped streams 217 are directed toward the adjacent longitudinal edges of a flat stream of polypropylene 215 as shaped by the blades 153. This arrangement thus provides for a more snug engagement between the separately shaped streams of molten polypropylene and is especially advantageous during high speed extrusion operations.

It is to be understood that changes and variations may be made without departing from the spirit and scope of the invention as defined in the appended claims.

I claim:

1. A method of shaping flowable plastic material into a unitary beaded edge film having a web of substantially uniform thickness throughout its width including the steps of delivering a mass of flowable plastic material, shaping a portion of the mass of plastic material into a flat stream having a substantially uniform cross section throughout its width, diverting other portions of the mass of plastic material and shaping the same into individual hollow streams spaced laterally of and aligned with the longitudinal edges of the flat stream, sealing the initial sections of said hollow streams, inflating the hollow streams with a gaseous medium, engaging the hollow inflated streams of plastic material with the longitudinal edges of the flat stream while the plastic material of both the hollow and flat streams are in a flowable condition, sealing the terminal sections of said hollow streams to contain the inflating gaseous medium therein, and setting the plastic material of the streams while they are in engaged relationship.

2. A method of shaping molten plastic material into a unitary beaded edge sheet having a web of substantially uniform cross section through its width including the steps of shaping a mass of molten plastic material into two independent and laterally spaced hollow streams of desired cross section, introducing and containing a gaseous medium within said hollow streams during the shaping thereof, concomitantly shaping a mass of molten plastic material into a flat stream extending between and spaced from the hollow streams of plastic material, said flat stream being of substantially uniform cross section throughout its width and of less thickness than the shaped streams of plastic material, engaging the hollow streams of plastic material with the longitudinal edges of the flat stream and cooling the same to provide a unitary structure.

3. A method of forming and stretching beaded edge films including the steps of shaping a plastic film-forming material into a flat stream having enlarged hollow portions along opposite longitudinal edges thereof, sealing initial sections of said hollow portions, inflating the hollow portions of said stream with a gaseous medium during the shaping thereof, setting the stream of film-forming material to provide a film having a web and hollow beaded longitudinal edges within which the gaseous medium is contained and stretching the web of the film at least along one of its longitudinal and transverse directions.

4. A method of making and stretching beaded edge films including the steps of shaping a flowable film-forming material into two independent hollow streams of desired cross section, introducing and containing a gaseous medium within said hollow streams during the shaping thereof, concomitantly and independently shaping flowable film-forming material into a flat stream of substantially uniform cross section throughout its width and of less thickness than the shaped hollow streams, engaging the inflated hollow streams with the longitudinal edges of the flat stream and setting the same in their engaged positions to provide a film having a web and beaded edges, and stretching the film web at least along one of its axes.

5. Apparatus for shaping a stream of plastic material into a continuous film having enlarged beads along opposite longitudinal edges thereof including an elongated housing, a restricted passage extending longitudinally of said housing and opening along one side thereof, means for supplying plastic material into said restricted passage, blades carried by said housing along said one side thereof defining an extrusion orifice in alignment with said restricted passage for shaping plastic material into a flat stream, plates closing at least a portion of the opposite ends of said extrusion orifice, end blocks carried by said housing outwardly of said plates, a channel formed in each of said end blocks and connected with the plastic material supply means, a tube extending through each of said channels in spaced relationship with the walls thereof, said tubes having exit portions terminating adjacent to said extrusion orifice and cooperating with the walls of the end block channels and adjacent plates for shaping plastic material into enlarged hollow streams and means for delivering a gaseous medium through said tubes and into the hollow streams as they issue from said channels, said exit portions of said tubes being shaped to urge the hollow streams of plastic film-forming material into engagement with the edges of the shaped flat stream as it leaves said extrusion orifice.

6. Apparatus as defined in claim 5 wherein at least the exit portions of the said tubes are directed toward each other.

7. Apparatus for shaping a stream of plastic material into a continuous film having enlarged beads along opposite longitudinal edges thereof including an elongated housing, a restricted passage extending longitudinally of said housing and opening along one side thereof, means for supplying plastic material into said restricted passage, blades carried by said housing along said one side thereof defining an extrusion orifice in alignment with said restricted passage for shaping plastic material into a flat stream, plates closing at least a portion of the opposite ends of said extrusion orifice, end blocks carried by said housing outwardly of said plates, a channel formed in each of said end blocks and connected with the plastic material supply means, a tube extending through each of said channels in spaced relationship with the walls thereof, said tubes having exit portions terminating adjacent to said extrusion orifice and cooperating with the walls of the end block channels and the adjacent plates for shaping plastic material into hollow streams and means for delivering a gaseous medium through said tubes and into the hollow streams as they issue from said channels, said channels being disposed in converging relationship with each other so as to direct the shaped hollow streams toward and into engagement with the edges of the shaped flat stream of film-forming material as it leaves said extrusion orifice.

References Cited by the Examiner

UNITED STATES PATENTS

| | | | |
|---|---|---|---|
| 2,331,195 | 10/43 | Jannsen | 18—59 |
| 2,686,931 | 8/54 | Knox | 18—12 |
| 2,728,941 | 1/56 | Alles et al. | 18—2 |
| 2,736,066 | 2/56 | Chren et al. | |
| 2,956,306 | 10/60 | Conwell et al. | |
| 3,014,234 | 12/61 | Koppehele | 18—48 |
| 3,072,962 | 1/63 | McDermott et al. | 18—120 |
| 3,078,504 | 2/63 | Koppehele | 264—289 |

FOREIGN PATENTS 1,110,856  7/61  Germany.

ALEXANDER H. BRODMERKEL, *Primary Examiner.*

MICHAEL V. BRINDISI, *Examiner.*